United States Patent [19]

Tsuji et al.

[11] Patent Number: 4,517,617
[45] Date of Patent: May 14, 1985

[54] FLEXIBLE MAGNETIC DISK CASSETTE AND A RECORDING AND/OR REPRODUCING APPARATUS FOR THE SAME

[75] Inventors: Akira Tsuji, Fujisawa; Sadayuki Ito, Yokohama; Kazumi Fujimoto, Hino, all of Japan

[73] Assignee: Sony Coporation, Tokyo, Japan

[21] Appl. No.: 292,914

[22] Filed: Aug. 13, 1981

[30] Foreign Application Priority Data

Aug. 14, 1980 [JP] Japan .................... 55-115307[U]

[51] Int. Cl.³ ............................................. G11B 23/02
[52] U.S. Cl. ....................................... 360/133; 360/99
[58] Field of Search ................... 360/133, 97–99; 206/444

[56] References Cited

U.S. PATENT DOCUMENTS

| | | | |
|---|---|---|---|
| 3,416,150 | 12/1968 | Lindberg, Jr. | 360/97 |
| 4,003,088 | 1/1977 | Schwartz | 360/133 X |
| 4,060,839 | 11/1977 | Meadows | 360/99 |
| 4,120,012 | 10/1978 | Bowers | 360/133 |
| 4,149,207 | 4/1979 | Porter, Jr. et al. | 360/133 |

*Primary Examiner*—John H. Wolff
*Attorney, Agent, or Firm*—Hill, Van Santen, Steadman & Simpson

[57] ABSTRACT

A recording and/or reproducing apparatus and a magnetic disk cassette having a flexible magnetic disk and a cover for containing the magnetic disk. The cover has a driving hole for driving the flexible magnetic disk from outside of the cover, a recording opening for exposing a recording surface of the flexible magnetic disk, and a cut-out portion provided on one side of the cover for detecting correct installation of the flexible magnetic disk cassette into a recording and/or reproducing apparatus. A shutter is slidably provided on the cover for selectively exposing the recording surface through the recording opening and the cut-out portion when the flexible magnetic disk is ready for use. The recording and/or reproducing apparatus for the flexible magnetic disk cassette includes a driving member engaged with the flexible magnetic disk through the driving hole of the cover for rotating the flexible magnetic disk. A transducing head is contacted with the recording surface of the flexible magnetic disk through the recording opening when the shutter is in an operative position. A projection is provided in the apparatus in facing relation to the cut-out portion of the cover when the flexible magnetic disk cassette is installed correctly.

10 Claims, 26 Drawing Figures

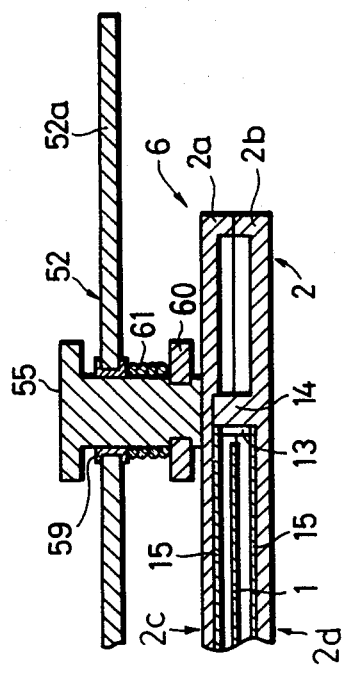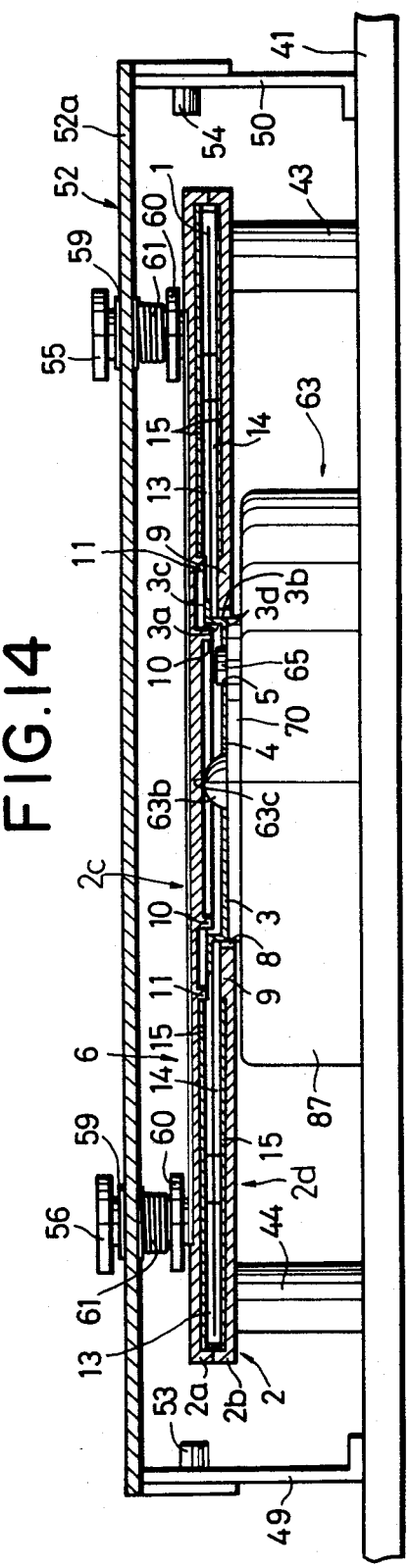

FLEXIBLE MAGNETIC DISK CASSETTE AND A RECORDING AND/OR REPRODUCING APPARATUS FOR THE SAME

BACKGROUND OF THE INVENTION

1. Field of the Invention

This invention relates to a flexible magnetic disk cassette capable of being used for the recording and reproducing of various analog and digital signals, and a recording and/or reproducing apparatus for the flexible magnetic disk cassette. More particularly, this invention is concerned with a disk cassette having a cassette cover in which is rotatably accommodated a recording and reproducing disk having flexibility such as a sheet-like magnetic disk (magnetic sheet), and a recording and/or reproducing apparatus for the same.

2. Description of the Prior Art

It has been known to construct a disk cassette having a cassette cover in which is accommodated a sheet-like magnetic disk (a magnetic sheet) installed (or loaded) onto a magnetic recording and/or reproducing apparatus. The disk is rotated at high speed, while a magnetic head is brought into sliding contact with the magnetic disk. The magnetic head is moved in a radial direction with respect to the magnetic disk to record and reproduce digital signals.

If there is no protective member, however, the magnetic disk is easily touched with fingers at the time of its loading or unloading operation, and accordingly problems result such as damage of the magnetic disk or adhesion of finger-prints on the magnetic surface.

In view of these problems, there has been proposed a construction wherein the magnetic disk is installed within the cassette cover.

However, at a portion of the cassette cover, there has to be formed a head insertion opening through which a magnetic head is inserted at the time of the recording or reproducing operation, and the portion of the magnetic disk corresponding to the head insertion opening is exposed to the exterior.

Therefore, dust can easily get in the cassette cover through the head insertion opening and which can adhere to the magnetic disk.

According to the conventional method of preventing such an inconvenience, while the disk cassette is not in use it is placed within a cassette protective jacket to prevent dust or the like from adhering to the magnetic disk.

SUMMARY OF THE INVENTION

An object of the present invention is to provide a flexible magnetic disk cassette which overcomes the foregoing problems associated with the prior art.

More specifically, it is an object of the present invention to provide a flexible magnetic disk cassette by which it is possible to prevent fingerprints or other foreign matter or dust from entering into the cassette cover and thereby to prevent the adhesion of dust to the recording medium.

Another object of the present invention is to provide a flexible magnetic disk cassette by which it is no longer necessary to use a cassette protecting jacket.

Another object of the present invention is to provide a flexible magnetic disk cassette which is reinforced.

It is a further object of the present invention to provide a recording and/or reproducing apparatus for the flexible magnetic disk cassette.

In accordance with an aspect of this invention, a flexible magnetic disk cassette includes a flexible magnetic disk. A cover is provided for containing the magnetic disk, the cover having a driving hole for driving the flexible magnetic disk from outside of the cover. A recording opening is provided for exposing a recording surface of the flexible magnetic disk, and a cut-out portion is provided on one side of the cover for detecting a correct installation of the flexible magnetic disk cassette into a recording and/or reproducing apparatus. A shutter is slidably provided on the cover selectively exposing the recording surface through the recording opening and the cut-out portion when the flexible magnetic disk is ready for use.

Furthermore, a recording and/or reproducing apparatus is provided for use with a flexible magnetic disk cassette of the type having a flexible magnetic disk. A cover is employed for containing the magnetic disk, the cover having a driving hole for driving the flexible magnetic disk from outside of said cover. A recording opening is provided for exposing a recording surface of the flexible magnetic disk, and a cut-out portion is provided on one side of the cover for detecting a correct installation of the flexible magnetic disk cassette into a recording and/or reproducing apparatus. A shutter slidably provided on the cover selectively exposes the recording surface through the recording opening and the cut-out portion when the flexible magnetic disk is ready for use. The system includes: a driving means engaged with the flexible magnetic disk through the driving hole of the cover for rotating the flexible magnetic disk. A transducing head means is contacted with the recording surface of the flexible magnetic disk through the recording opening when the shutter is in an operative position. A projection is provided in the apparatus in facing relation to the cut-out portion of the cover when the flexible magnetic disk cassette is installed correctly.

BRIEF DESCRIPTION OF THE DRAWINGS

FIG. 13 is a sectional view taken on line XIII—XIII of FIG. 12;

FIG. 14 is a sectional view taken on line XIV—XIV of FIG. 12;

DESCRIPTION OF THE PREFERRED EMBODIMENTS

An embodiment of this invention will be described with reference to FIG. 1 to FIG. 26.

In this embodiment, a flexible magnetic disk cassette containing a sheet-like flexible magnetic disk is installed onto a recording and/or reproducing apparatus and the recording and/or reproducing operation is performed.

Figure 1:
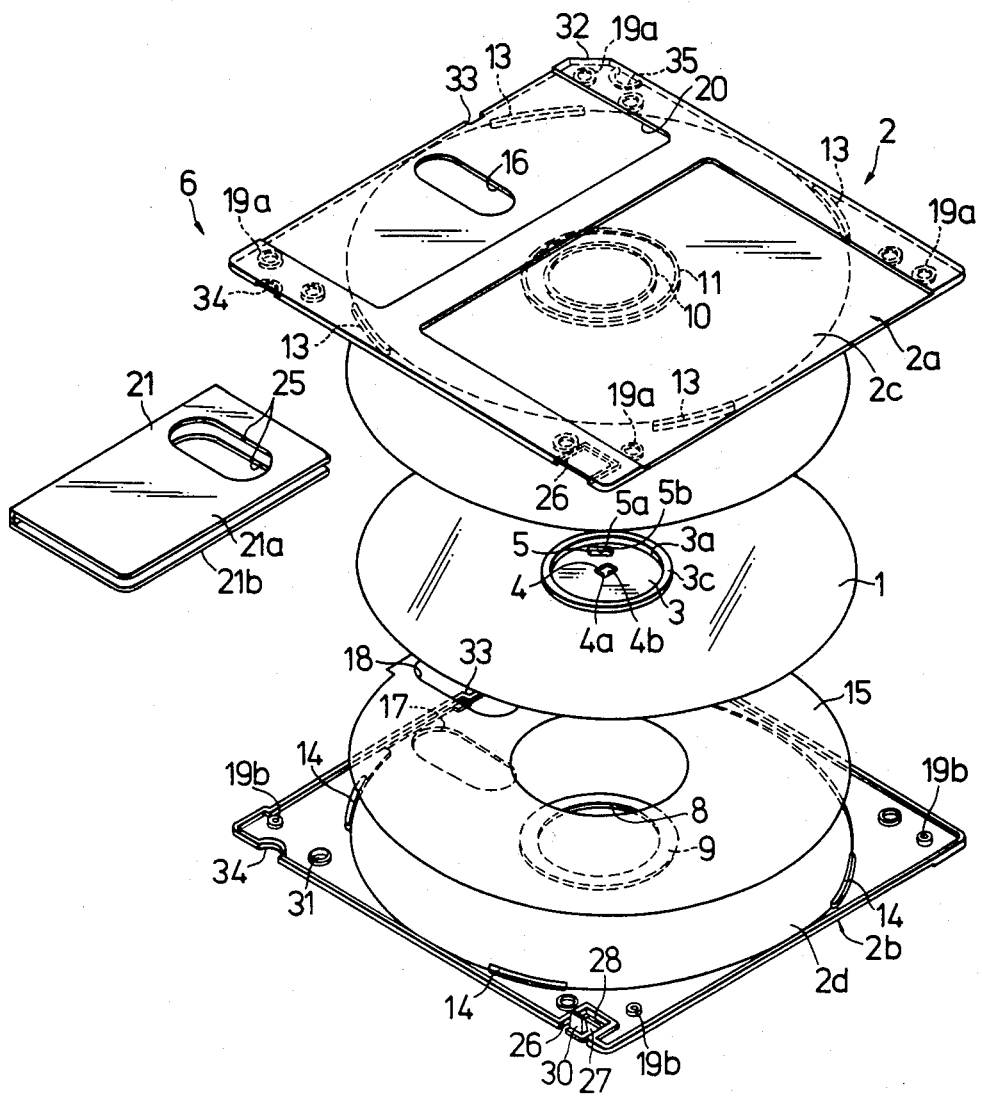
FIG. 1 is an exploded perspective view of a disk cassette according to an embodiment of this invention.
Figure 5:
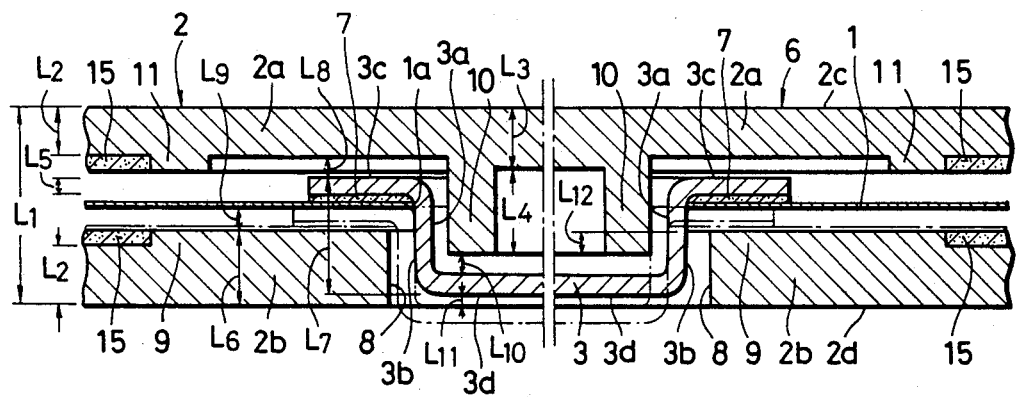
FIG. 5 is a longitudinal sectional view of a main part of the disk cassette showing its central portion, partly omitted.

First, an explanation is here given concerning a disk cassette 6 comprising a flexible magnetic disk 1 and a cassette cover 2. As shown in FIG. 1, the flexible magnetic disk 1 is formed of, for example, a thin disk-like high polymer film having a thickness of 0.4 mm, and a magnetic layer uniformly formed on both surfaces to which a recording/reproducing magnetic head is to be brought into contact. At the center of the flexible magnetic disk 1 there is formed a circular center opening 1a (See FIG. 5) at which there is attached a center core disk 3 made of a ferromagnetic material such as iron. The center core disk 3 is formed from a flat disk by pressing and, as shown in FIG. 1 and FIG. 5, on one side thereof there is formed a center hollow 3a and on the other side there is formed a ring-like raised fringe 3c. Thus the center core disk 3 is constructed in the form of a pan. As shown in FIG. 5, a ring-like double-sided adhesive sheet 7 is bonded to the raised fringe 3c of the center core disk 3, and the peripheral edge portion of the center opening 1a of the magnetic disk 1 is bonded to the double-sided adhesive sheet 7, whereby the center core disk 3 and the flexible magnetic disk 1 are joined together integrally.

At a nearly central part of the center core disk 3, a square center aperture 4 having a V-shaped corner is formed as a motor shaft insertion aperture, and at a positon which is distant by a predetermined distance from the center aperture 4, a rectangular driving and positioning aperture 5 is formed as a positioning-pin insertion aperture. As clearly shown in FIG. 3, the center $O_1$ of the center aperture 4 is off the center $O_2$ of the center core disk 3 and the flexible magnetic disk 1, and is slightly distant by a predetermined distance toward the driving and positioning aperture 5. The center aperture 4 and the driving and positioning aperture 5 are formed so that a pair of diagonal lines $d_1$ and $d_2$ of the center aperture 4 are each parallel with short and long side portions 5b and 5a of the driving and positioning aperture 5, respectively. Furthermore, the length of one side of the center aperture 4 is slightly larger than the diameter of the motor shaft so that the motor shaft when fitted in the center aperture 4 provides a slight looseness. The reason why the center of the center aperture 4 is apart from the center of the center core disk 3, as will be described in detail later, is that it is intended to coincide the center of the motor shaft fitted in the center aperture 4 of the center core disk 3 with the center of the flexible magnetic disk 1 when the disk cassette 6 is installed onto the recording and/or reproducing apparatus.

Figure 2:
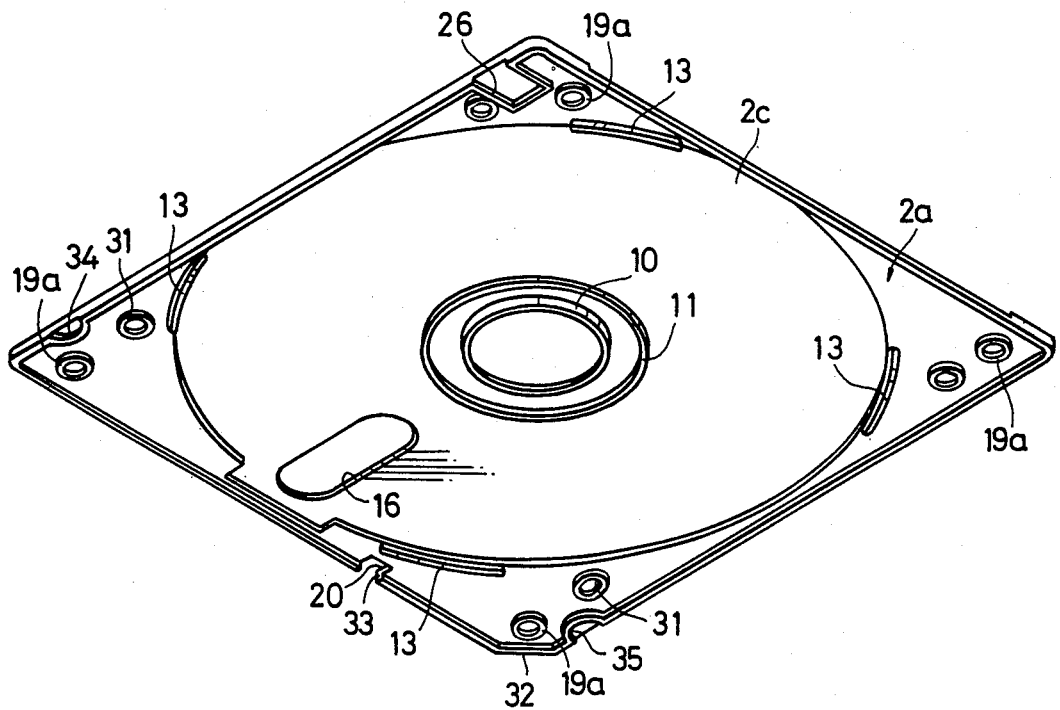
FIG. 2 is a perspective view of an upper half of a cassette cover viewed from below.
Figure 3:
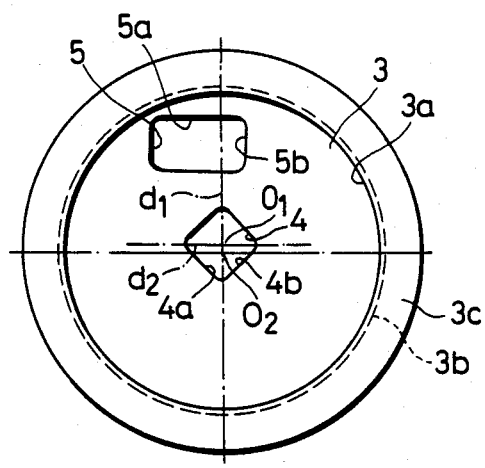
FIG. 3 is a plan view of a center core disk viewed from a recessed side thereof.
Figure 4:
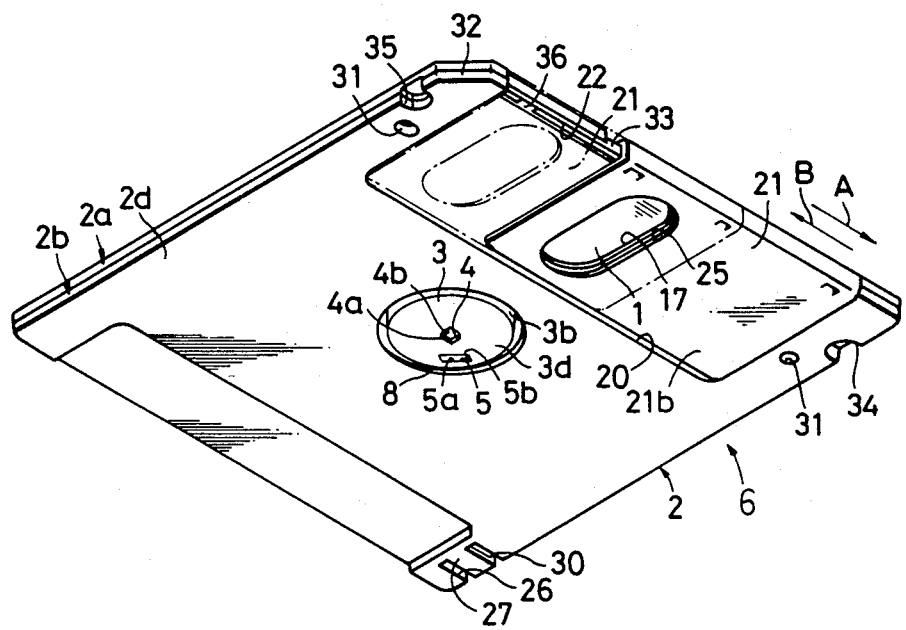
FIG. 4 is a perspective view of the disk cassette viewed from below.

On the other hand, the cassette cover 2 for accommodating the flexible magnetic disk 1, as shown in FIG. 1, is composed of an upper half 2a and a lower half 2b which are made of, for example, an injection molded article from ABS resin containing an antistatic agent. The outer peripheral portions of the upper and lower halves 2a and 2b are welded to each other to form a flat rectangular parallelepiped as a whole. At a nearly central part of lower half 2b there is formed a circular center opening as a driving hole 8, and at the peripheral edge portion of the driving hole 8 and on the inner surface of the lower half 2b there is integrally formed a ring-like projection 9. As shown in FIGS. 4 and 5, the convexed portion 3b of the center core disk 3 is fitted in the driving hole 8 in a state which is slightly loose. On the inner surface of the central part of the upper half 2a, as shown in FIGS. 2 and 5 there is integrally formed a ring-like projection 10, and also around the projection 10 there is integrally formed a ring-like projection 11 which is concentric with the projection 10. The projecting length of the projection 10 is longer than that of the projection 11 and hence, as shown in FIG. 5, the projection 10 extends beyond the projection 11 and projects on the inner surface side of the lower half 2b. The ring-like projection 10 is inserted in the center hollow 3a of the center core disk 3 in a state which is slightly loose.

Now, the cassette case 2, the upper and lower halves 2a and 2b, the center core disk 3, and the ring-like projection 10 of the upper half 2a are, for example, in the following dimensional relation. The thickness $L_1$ of the cassette case 2 is 3.4 mm, the thickness $L_2$ of an upper plate 2c and that of a lower plate 2d of the upper and lower halves 2a and 2b are each 0.8 mm respectively, the thickness $L_3$ of the upper plate 2c of the upper half 2a of the portion surrounded with the projection 10 is 1.0 mm, the projecting length $L_4$ of the projection 10 is 1.5 mm, the thickness $L_5$ of the center core disk 3 is 0.3 mm, the thickness $L_6$ of the lower plate 2d of the lower half 2b adjacent to the center opening 8 is 1.3 mm, and the height $L_7$ of the center core disk 3 is 1.8 mm (See FIG. 5).

When the disk cassette 6 is installed onto the recording and/or reproducing apparatus as will be described later, the flexible magnetic disk 1 is disposed nearly centrally in the direction of the thickness of the cassette cover 2 as shown by the solid line in FIG. 5 and then is rotated. In this case, the distance $L_8$ between the fringe 3c of the center core disk 3 and the inner surface of the upper half 2a and the distance $L_9$ between the flexible magnetic disk 1 and the projection 10 of the lower half 2b are each 0.4 mm. The distance $L_{10}$ between the tip end of the projection 10 of the upper half 2a and a lower surface 3d of the center disk 3 is 0.4 mm, and the distance $L_{11}$ between the outer surface of the lower half 2b and the lower surface 2d of the center core disk 3 is 0.2 mm (See FIG. 5). When the disk cassette 6 is not in use, the center core disk 3 and the flexible magnetic disk 1 are placed on the lower half 2b by virtue of their own weights, for example, as shown by dot-dash line in FIG. 5. In this case, the tip end portion of the projection 10 of the upper half 2a and the projection 9 of the lower half 2b overlap with each other by 0.4 mm (distance $L_{12}$) so even if the center core disk 3 is moved, a part of the center hollow 3a of the center core disk 3 is sure to engage the projection 10. Thereby the looseness in a planar direction of the center core disk 3 and hence the flexible magnetic disk 1 is kept within a predetermined range, and therefore the projection 10 and the center hollow 3a of the center core disk 3 are not disengaged from each other along with the displacement of the center core disk 3. In case the disk cassette 6 is turned upside down from the state shown in FIG. 5 and consequently the center core disk 3 is placed on the upper half 2a by virtue of its own weight, the projection 10 comes into a completely fitted state within the center hollow 3a of the center core disk 3, so that, as in the aforesaid case, the amount of displacement of the center core disk 3 and hence of the magnetic disk 1 is kept within a predetermined range.

In the disk cassette 6 having the above construction, the amount of displacement of the center core disk 3 and of the flexible magnetic disk 1 can be regulated exactly by the projection 10 until a gap between the upper and lower plates 2c and 2d becomes wider by 2.2 mm (the sum of the overlapping length of 0.4 mm and the center core disk height of 1.8 mm) while the upper and lower halves 2a and 2b are moved from the state shown in FIG. 5 toward the exterior, namely in the direction in which the upper plate 2c and the lower plate 2d go away from each other.

On the inside surfaces of the upper and lower halves 2a and 2b there are integrally formed four arcuate ribs 13 and 14 respectively extending concentrically with the driving hole 8 at regular intervals. When the cassette cover 2 is assembled, the ribs 14 of the upper half 2a and the ribs 14 of the lower half 2b are disposed on the same circumference, and at the same time the ribs 13 and 14 are positioned adjacent to each other at the four corners of the cassette cover 2 whereby there is formed substantially one pair of ribs at each corner. The flexible magnetic disk 1 is disposed so as to be surrounded with these ribs 13 and 14. The ribs 13 abut the inner surface of the lower plate 2d of the lower half 2b, and the ribs 14 abut the inner surface of the upper plate 2c of the upper half 2a. Accordingly, the cassette cover 2, which is flat and easy to deform even by a small external force, is mechanically reinforced. Furthermore, in order to avoid possible damage or wear of the flexible magnetic disk 1, a magnetic disk protecting non-woven fabric 15 is attached by heat-weld or a like means between the projection 11 and the ribs 13 and also between the projection 9 and the ribs 14 in the upper and lower halves 2a and 2b.

The distance from the center of the driving hole 8 of the lower half 2b to the ribs 13 and 14 is somewhat longer than the radius of the flexible magnetic disk 1 so that even if the flexible magnetic disk 1 is displaced within the cassette cover 2 with the looseness of the center core disk 3 in the driving hole 8, the peripheral edge portion of the flexible magnetic disk does not abut the ribs 13 and 14.

In the upper and lower halves 2a and 2b of the cassette cover 2 and the non-woven fabric 15, there are respectively formed openings 16, 17, and 18 of the same shape extending in a radial direction of the flexible magnetic disk 1, the openings 16, 17 and 18 being overlapped in opposed relation. And as will be described later, a magnetic head is inserted from the opening 17 formed in the lower half 2b through the opening formed in the lower non-woven fabric 15, while a head pressing pad is inserted from the opening 16 formed in the upper half 2a through the opening 18 formed in the upper non-woven fabric 15. In FIG. 1, the reference numerals 19a, 19b, are positioning projections for mutual engagement when assembling the upper and lower halves 2a and 2b.

Figure 6:
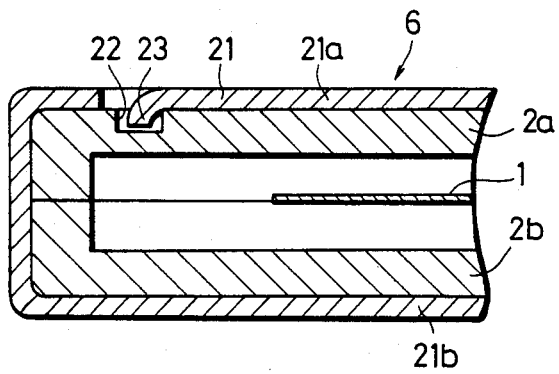
FIG. 6 is a longitudinal sectional view of a main part of the disk cassette showing a guide means comprising a guide groove formed in the cassette cover and a pawl-like projection formed on a shutter.
Figure 7:
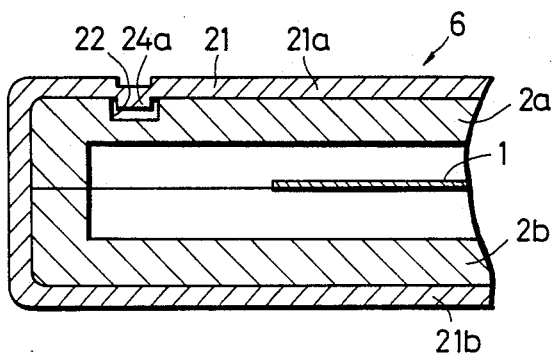
FIG. 7 and FIG. 8 are each a longitudinal sectional view of a main part of the disk cassette showing a modification of the guide means.
Figure 8:
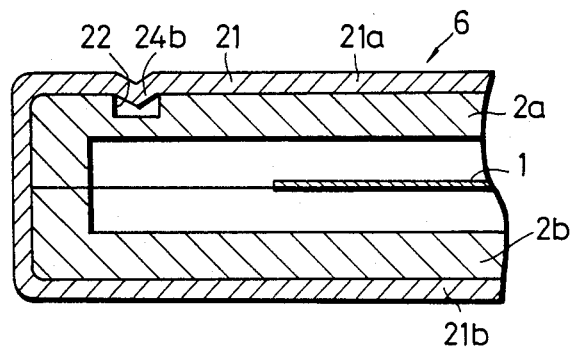

As shown in FIGS. 1 and 4, there is formed a recess 20 on each of the outer surfaces of the upper and lower halves 2a and 2b in the respective portions where there are formed the pad insertion opening 16 and the head insertion opening 17. In the recess 20 there is mounted a shutter 21 having a U-shaped cross-section made from aluminum, stainless steel, a synthetic resin, or the like, so as to be slidable in a predetermined direction. In the recess 20 of the lower half 2b, as shown in FIG. 4, a rectilinear guide groove 22 is formed extending along a side edge portion of the cassette cover 2, while in relation to the guide groove 22 there is formed in the shutter 21, as shown in FIG. 6, a pawl-like projection 23, for example in three places, formed by inwardly bending a part of the shutter 21 by means of pressing or the like. The pawl-like projection 23 of the shutter 21 is inserted in the guide groove 22 of the lower half 2b so that the shutter 21 is guided by the guide groove 22 slidably in the direction of arrows A and B in FIG. 4. The shutter sliding mechanism is not limited to what has just been mentioned. For example, as shown in FIG. 7, a part of the shutter 21 may be subjected to half-blanking by means of pressing or the like to form a projection 24a which projects inwardly of the shutter 21, and the projection 24a is slidably fitted in the guide groove 22. Further, as shown in FIG. 8, a V-shaped projection 24b may be formed which projects inwardly of the shutter 21. This projection 24b is slidably fitted in the guide groove 22.

In the side edge portion of the lower half 2b where the guide groove 22 is formed, as shown in FIG. 4, there is formed a shutter mounting and demounting recess 36 in communication with the guide groove 22, for example in three places. When the shutter 21 is slided, for example, in the direction of arrow B in FIG. 4 to the position indicated with a dot-dash line, the recess 36 and the pawl-like projection 23 of the shutter 21 become opposed to each other. In this state, if a force is applied in a pulling direction of the shutter 21 from the cassette cover 2, the shutter 21 can be easily demounted or removed from the cassette cover 2.

In each of the opposed plate portions 21a and 21b of the shutter 21 there is formed an opening 25 having substantially the same shape as the pad and head insertion openings 16 and 17. By sliding the shutter 21 along the guide groove 22, the pad and head insertion openings 16 and 17 can be opened or closed selectively. In case the shutter 21 is disposed in such a position as indicated with a solid line in FIG. 4, the opening 25 in the shutter 21 and the openings 16 and 17 in the cassette cover 2 become overlapped with one another, that is the openings 16 and 17 are opened. On the other hand, in case the shutter 21 is slid to the position shown with a dot-dash line in FIG. 4, the openings 16 and 17 are covered and closed with the shutter 21.

In the side portion of the cassette cover 2 where the shutter 21 is mounted, there is formed a channel-shaped cut-out portion 33 as shown in FIG. 1 and FIG. 4. This cut-out portion 33 is opened or closed along with the above-described sliding movement of the shutter 21. That is, when the opening 25 in the shutter 21, the openings 16 and 17 in the cassette cover 2, and the opening 18 of the fabric 15 overlap each other, the cutout portion 33 is opened, while when the openings 16, 17 and 18 are covered with the shutter 21, the cutout portion 33 is also closed. In case the cutout portion 33 is opened, as will be described later, the cassette cover 2 can be installed up to the right position of the recording and/or reproducing apparatus, and reproducing operations can be performed. But, in case the cut-out portion 33 is closed by the shutter 21, as will be described later, the disk cassette 6 cannot be installed in the normal operating position on the apparatus and therefore undesired operation is prevented. In order to prevent the cassette cover 2 from being installed in an erroneous direction, there is formed a triangular cutout portion 32 at one predetermined corner of the the cassette cover 2.

Figure 9:
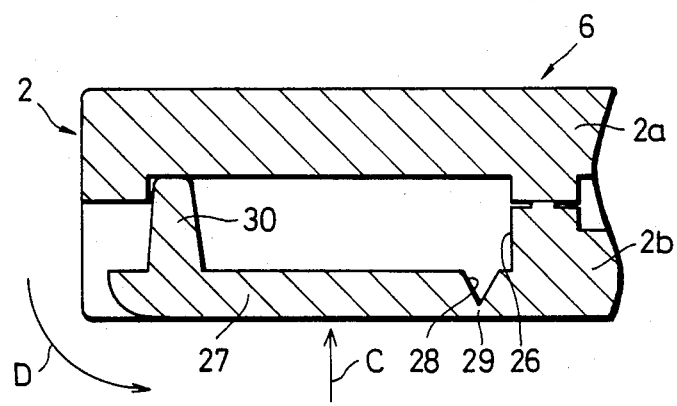
FIG. 9 is a longitudinal sectional view of a main part of the disk cassette showing an erroneous erase preventing detent formed on the cassette cover.

In this embodiment, moreover, there is provided an erroneous erase preventing mechanism at one corner of the cassette cover 2 so that the information recorded on the flexible magnetic disk 1 may not be erased by mistake. That is, as shown in FIG. 1 and FIG. 9, a channel-shaped cut-out portion 26 is provided at a predetermined corner of the lower half 2b of the cassette cover 2, and within the cut-out portion 26 an erroneous erase preventing detent 27 is connected integrally with the lower half 2b through a thin portion 29 formed by a V-shaped groove 28. On the inner surface on the tip end side (free end side) of the detent 27 there is integrally formed an abutment 30 extending toward the upper plate 2c of the upper half 2a and the tip end of the abutment 30 is in contact with the inner surface of the upper plate 2c. Accordingly, even when there is exerted an urging force in the direction of arrow C in FIG. 9, the erroneous erase preventing detent 27 is not separated from the lower half 2b. If it is desired to separate the detent 27 from the lower half 2b for the prevention of an erroneous erase, a pivotal force may be applied in the direction of arrow D in FIG. 9 to the tip end of the detent 27 whereby the thin portion 29 can be cut easily to remove the detent 27 by folding. The reason for such a construction is that in the thin cassette cover 2 it is restricted, by thickness, to push and fold off the detent 27 inwardly. The construction as in this embodiment permits the detent 27 to be folded off surely and easily.

At the two corner portions on the side of the opening 17 of the lower half 2b and in positions outwardly deviated from the ribs 14, there are formed a pair of positioning holes 31 for poisitioning the cassette cover 2 when the disk cassette 6 is installed onto the recording and/or reproducing apparatus. In this embodiment, moreover, auto loading cutout portions 34 and 35 having a semicircular section are formed in both side portions of the cassette cover 2. Within the cutout portions 34 and 35 there are inserted a pair of supporting rods (not shown) of a predetermined moving mechanism for holding the cassette cover 2 and moving the latter automatically to a predetermined position as necessary. Consequently, by utilizing the auto loading cut-out portions 34 and 35 it is possible to construct the apparatus so that there can be performed an automatic change of the disk cassette 6 and an automatic cassette take-out operation at the time of quality inspection.

The following description is now provided with reference to FIG. 10 to FIG. 26 concerning the structure of the recording and/or reproducing apparatus onto which the disk cassette 6 is installed.

Figure 10:
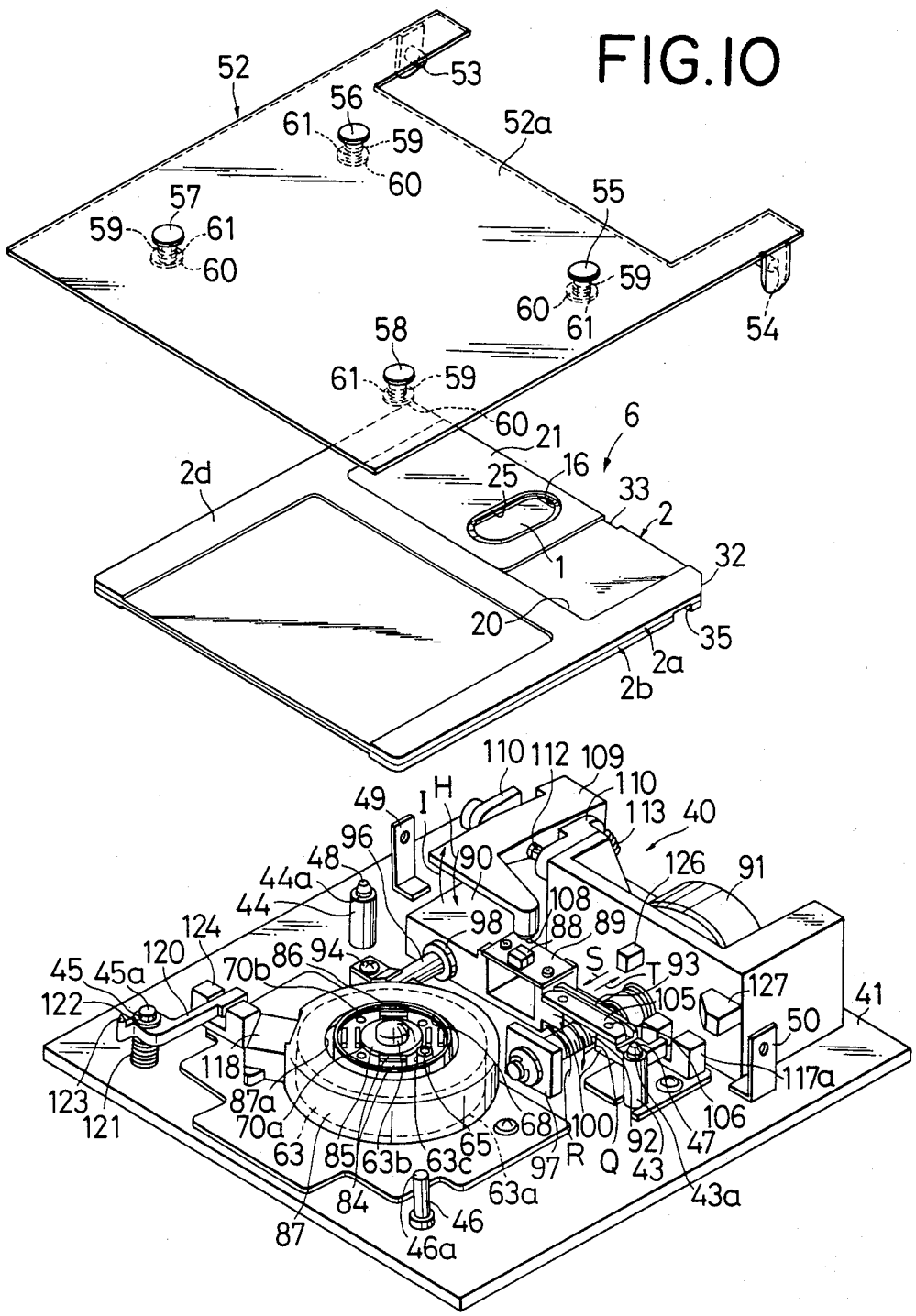
FIG. 10 is an exploded perspective view showing the disk cassette and a main part of a recording and/or reproducing apparatus according to the embodiment of this invention and onto which is to be installed the disk cassette.
Figure 11:
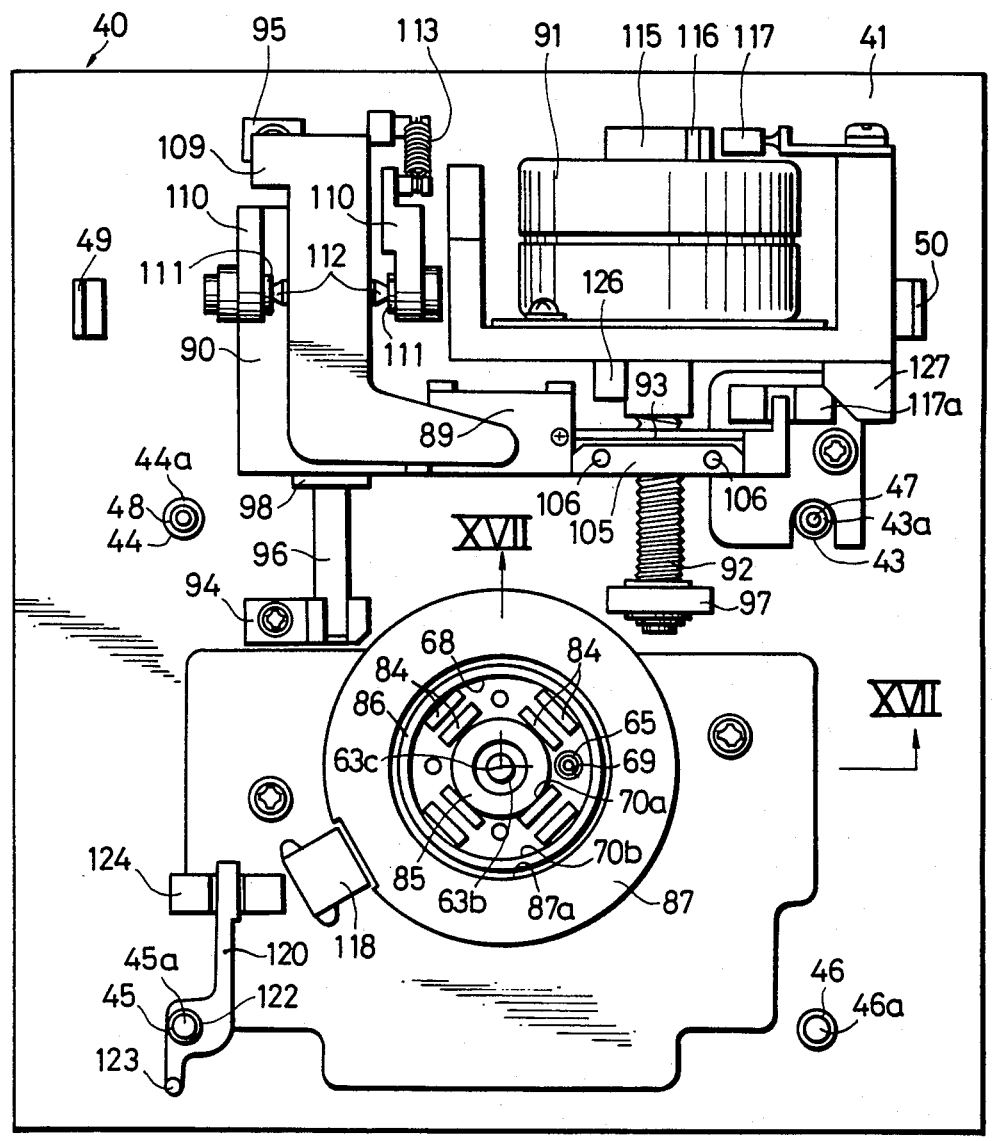
FIG. 11 is a plan view of the above apparatus with a cassette pressure member removed.
Figure 12:
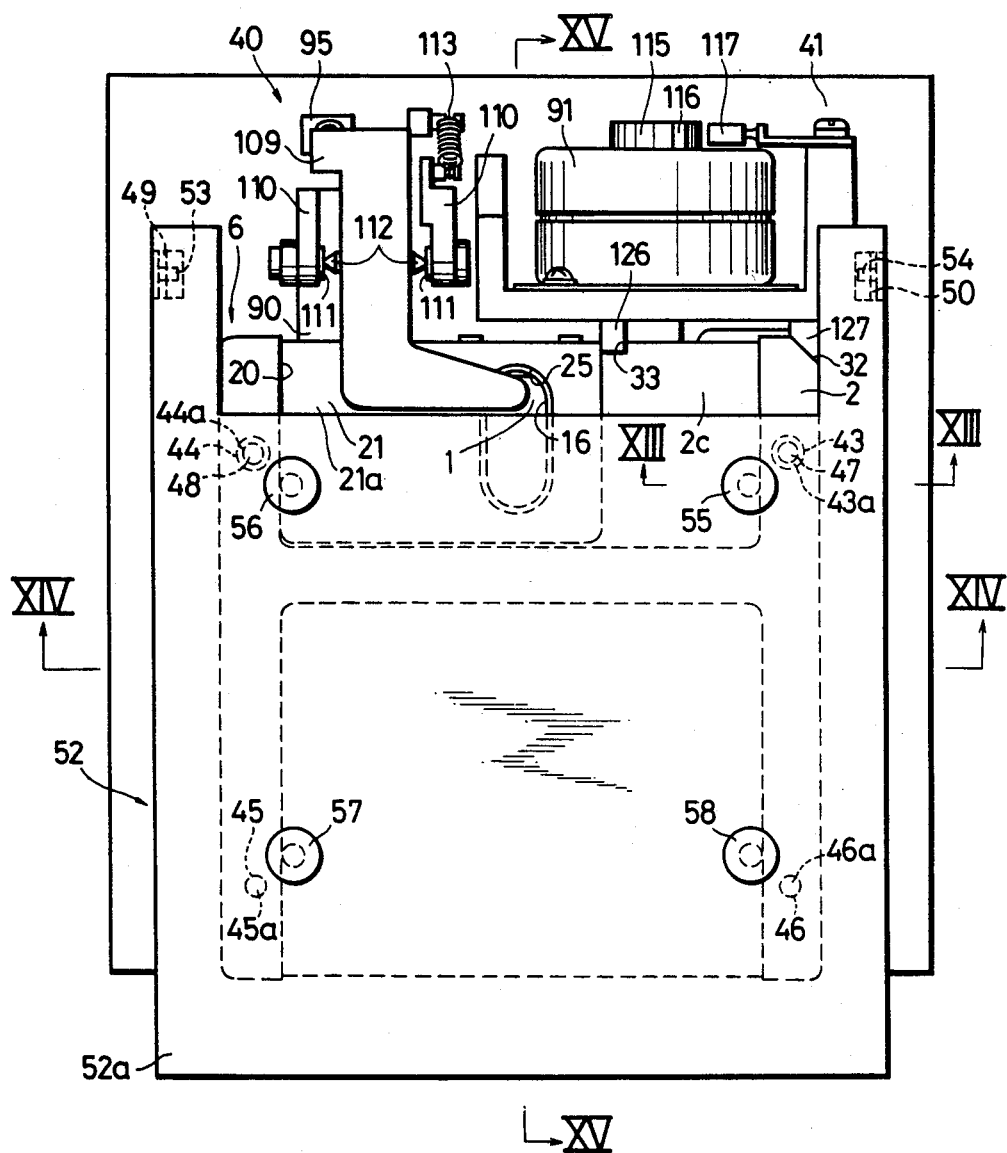
FIG. 12 is a plan view of the apparatus with the cassette pressure member mounted.

As shown in FIG. 10 to FIG. 12, on a chassis 41 of a recording and/or reproducing apparatus (hereinafter referred to simply as the "apparatus") 40 there are mounted four cassette receiving pins 43, 44, 45 and 46 for receiving the disk cassette 6. Among these pins, on the upper ends of the two pins 43 and 44 there are integrally formed cassette positioning projections 47 and 48 respectively adapted to fit in the pair of positioning holes 31 formed in the cassette cover 2. The cassette receiving pins 43, 44, 45 and 46 are respectively provided at their upper ends with receiving surfaces 43a, 44a, 45a and 46a, which are equal in height with respect to the chassis 41.

Figure 15:
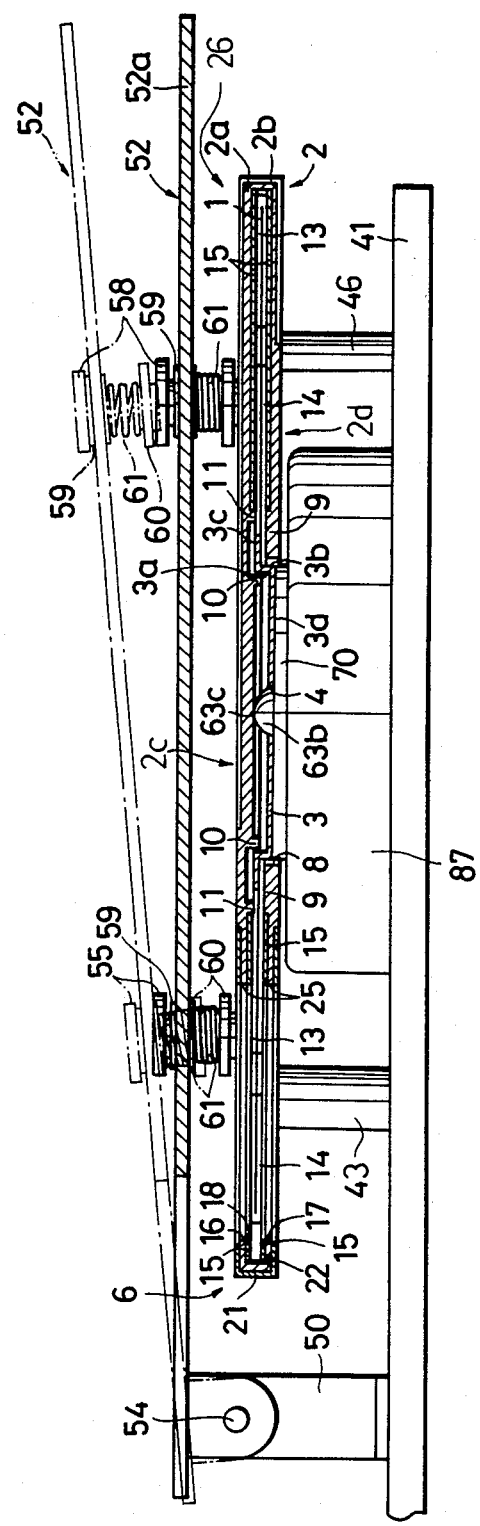
FIG. 15 is a sectional view taken on line XV—XV of FIG. 12.

Onto the chassis 41 there are fixed a pair of L-shaped supporting members 49 and 50, to which a cassette pressure member 52 is attached by pivots 53 and 54 respectively. The cassette pressure member 52 has a plate body 52a, and four cassette pressing pins 55, 56, 57 and 58 mounted on the lower surface of the plate body 52a. That is, as shown in FIG. 13 to FIG. 15, these pins 55 to 58 are slidably supported in the vertical direction by a sleeve 59 provided in the plate body 52a and at the same time are normally biased resiliently downwards by a compression coiled spring 61 interposed between the sleeve 59 and a spring shoe 60. Accordingly, the disk cassette 6 is pressed for holding toward the cassette receiving pins 43, 44, 45 an 46 by the cassette pressing pins 55, 56, 57 and 58.

In this embodiment, as is apparent from FIG. 12, the disk cassette 6 is received at its four corners by the cassette receiving pins 43, 44, 45 and 46. On the other hand, the positions wherein the cassette pressing pins 55, 56, 57 and 58 of the cassette pressure member 52 hold down the disk cassette 6 are each deviated by a predetermined length from the positions of the pins 43, 44, 45 and 46 toward the central side of the disk cassette 6. That is, the cassette pressing pins 55 and 57 are disposed nearly on a line joining the cassette receiving pins 43 and 45 and are disposed, between these pins 43 and 45, and are so constructed as to be in corresponding relation to the ribs 13 and 14 of the disk cassette 6. The cassette pressing pins 56 and 58 and the cassette receiving pins 44 and 46 are disposed also in the same relation as above.

Figure 16:
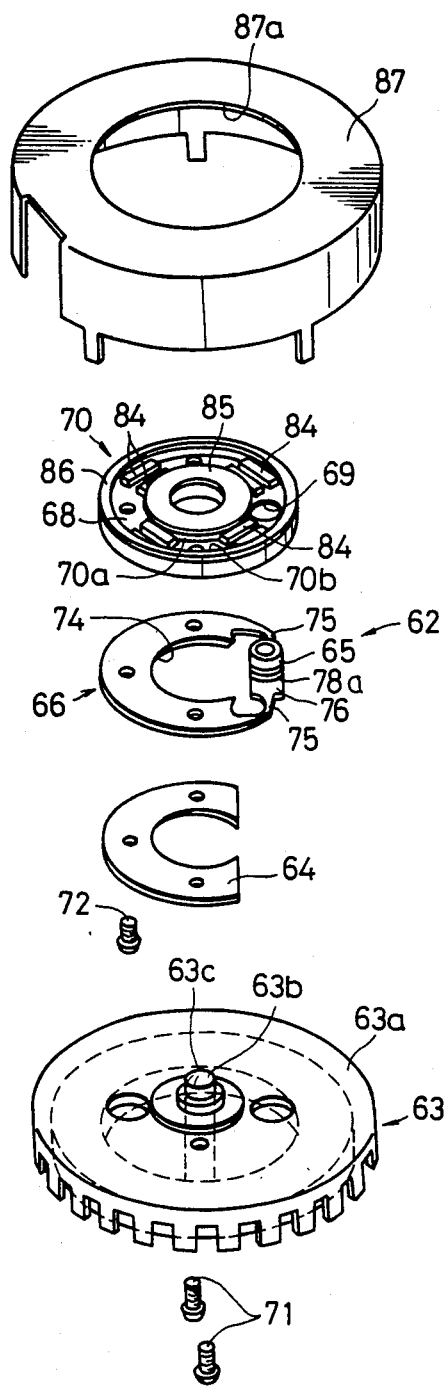
FIG. 16 is an exploded perspective view showing a mounting state of a rotor of a motor, a spacer, and a leaf spring to which is attached a spring-biased driving pin, a yoke and a motor cover.

On the chassis 41 there also is mounted a driving mechanism 62 for rotating the flexible magnetic disk 1 in the disk cassette 6. At a nearly central position of the portion surrounded with the cassette receiving pins 43, 44, 45, and 46, there is mounted a flat-type brushless motor 63 for rotating the flexible magnetic disk 1 in the disk cassette 6. As shown in FIG. 16, on the upper surface of a rotor 63a of the motor 63, a spacer 64 is positioned in the form of a partially cutout ring-like disk along with a leaf spring member 66 to which is fixed a spring-biased driving pin 65 for positioning (centering) the flexible magnetic disk 1.

In the cassette cover 2, a disk-like yoke 70 having a ring-like recess 68 formed in the upper surface thereof is tightened together with a pair of setscrews 71. The leaf spring member 66 is interposed between the spacer 64 and the yoke 70. The spacer 64, the leaf spring member 66, and the yoke 70 are further tightened together with a setscrew 72, so that these components are rotated together with a motor shaft 63b of the motor 63.

Figure 17:
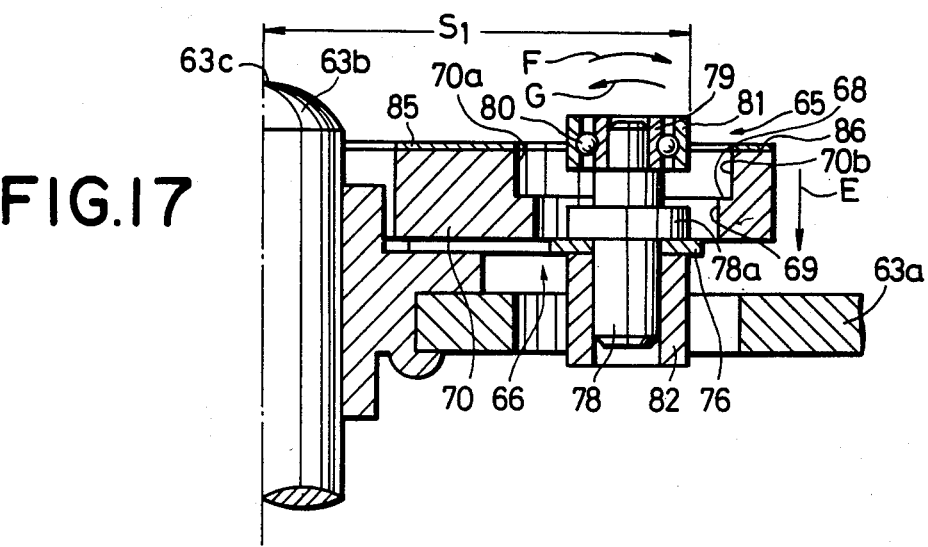
FIG. 17 is a sectional view taken on line XVII—XVII of FIG. 11.
Figure 18:
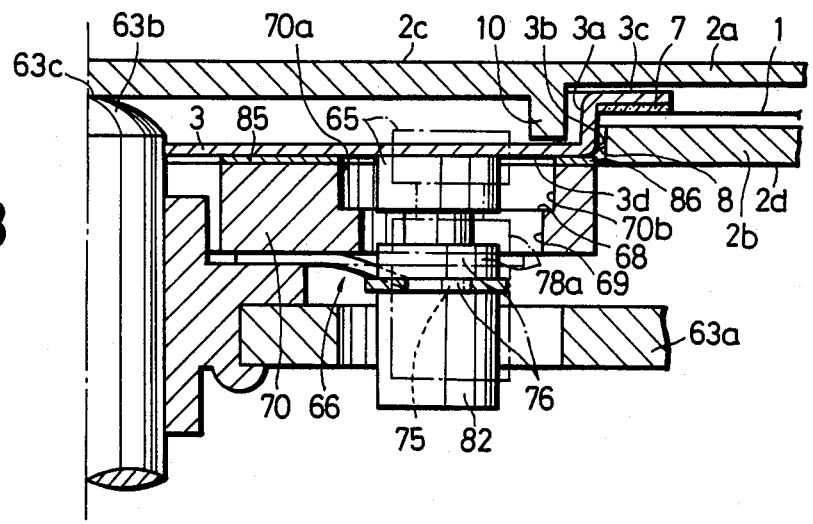
FIG. 18 and FIG. 19 are sectional views similar to FIG. 17 illustrating the operation of the spring-biased driving pin.
Figure 19:
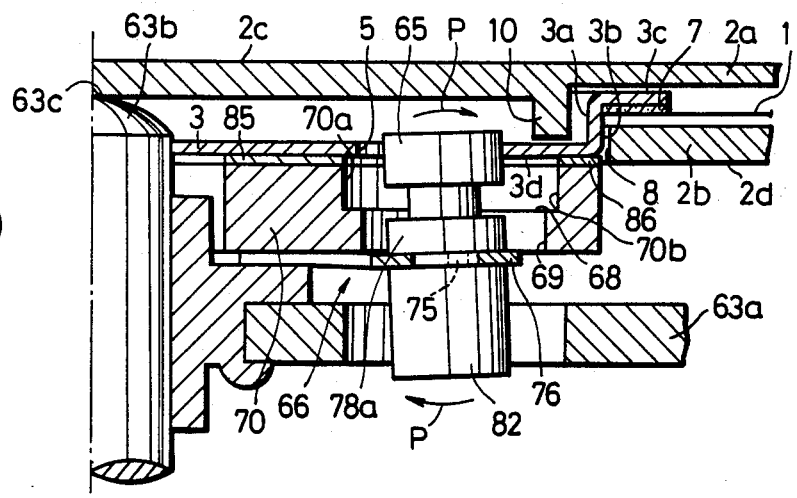

In a nearly central part of the leaf spring member 66, as shown in FIG. 16, there is formed a generally horseshoe-shaped opening 74. A pin mounting portion 76 is also integrally formed with a pair of narrowly formed L-shaped arm portions 75, the pin mounting portion 76 being supported from both sides by the pair of arm portions 75. The driving pin 65 is fixed to the pin mounting portion 76. The spring-biased driving pin 65, as shown in FIG. 17 to FIG. 19, is constructed of a stem portion 78 having a nearly centrally located flange 78a, a bearing portion 79 fitted and fixed over the upper end portion of the stem portion 78, and a cylindrical portion 81 mounted rotatably with respect to the stem portion 78 by means of a ball bearing 80 disposed between the bearing portion 79 and the cylindrical portion 81. The stem portion 78 extends through the pin mounting portion 76. On the lower end portion of the extending portion of the stem portion 78 there is fixed a cylindrical mounting member 82. By the flange 78a of the stem portion 78 and the mounting member 82, the pin mounting portion 76 of the leaf spring member 66 is held in place whereby the spring-biased driving pin 65 is secured to the pin mounting portion 76. The pin 65 is disposed in such a state that the cylindrical portion 81 of the pin 65 has passed through a piercing hole 69 formed in the recess 68 of the yoke 70. Consequently, within the piercing hole 69, the pin 65 is capable of being moved in the direction of arrow E in FIG. 17 by the resilience of the leaf spring member 66, and particularly it is pivotable in the direction of arrows F and G centered on the arm portion 75 in FIG. 17 (in other words, it is movable in the radial direction of the yoke 70). The pin 65 is mounted in such a position that the distance S1 shown in FIG. 17 is slightly longer than the distance S2 shown in FIG. 26.

A top portion 63c of the motor shaft 63b of the motor 63 is generally hemispherical, and the height of the top portion 63c of the motor shaft 63b is set to a predetermined level. As will be described in detail later, in case the upper plate 2c of the cassette cover 2 warps to the lower plate 2d when installing the disk cassette 6 onto the apparatus 40, the top portion 63c engages the inner surface of the upper plate 2c to correct the inward warp of the latter.

On the other hand, in the recess 68 of the yoke 70 four pairs of magnets 84 are fixed with an adhesive or the like at nearly equal intervals in the circumferential direction. On the upper surfaces of inner and outer flanges 70a, 70b, of the yoke 70 there are stuck lubricant sheets 85, 86, respectively consisting of a Teflon (Trademark of duPont deNemours & Co.), sheet or the like incorporating carbon. As shown in FIG. 17 to FIG. 19, the upper surfaces of the lubricant sheets 85 and 86 (i.e. the receiving surfaces for the center core disk (3)) are positioned to be flush with each other and above the upper surfaces of the magnets 84. The cylindrical portion 81 of the pin 65 is in an upwardly projecting state from the upper surfaces of the lubricant sheets 85 and 86.

In FIG. 10 and FIG. 11, the reference numeral 87 is a motor cover having an opening 87a formed in the upper surface thereof. Within the opening 87a the yoke 70 is rotably disposed within the opening 87a and the lubricant sheets 85 and 86 stuck on the yoke 70 are projecting upwardly from the upper surface of the motor cover 87.

Next, an explanation will be given concerning a head moving unit in the apparatus 40.

The head moving unit includes a head support 90 onto which a magnetic head 88 is secured on a mounting plate 89, together with a feed screw 92 which is driven by a step motor 91 about the axis thereof. As shown in FIGS. 10 to 12, the step motor 91 is screwed to a vertical piece 93 of the chassis 41, and a motor shaft 91a of the step motor 91 is directly connected to the feed screw 92. The other end of the feed screw 92 is rotatably attached to a cutup piece 97 of the chassis 41. The feed screw 92 is disposed horizontally with respect to the chassis 41.

In this embodiment, the head support 90 is constructed so as to be movable along the axis of the feed screw 92. That is, a pair of guide shaft mounting portions 94,95 are provided on the chassis 41, and both end portions of a guide shaft 96 having a circular section are fixed to the mounting portions 94, and 95. The guide shaft 96, which is disposed in parallel with the feed screw 92, extends through the head support 90 and in this state is borne by a sleeve 98 fixed to the head support 90. Consequently, the head support 90 is slidable while being guided by the guide shaft 96 in the direction of arrows S and T in FIG. 10 and FIG. 22.

Figure 20:
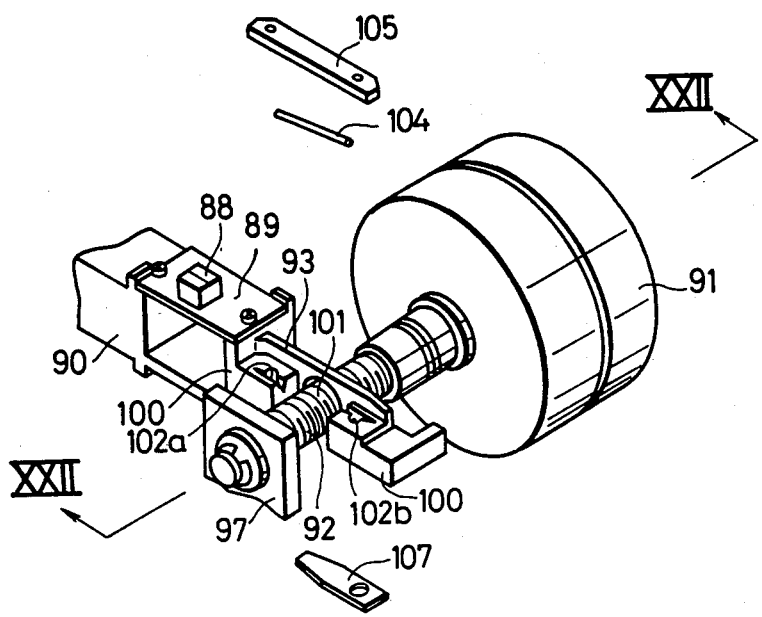
FIG. 20 is an exploded perspective view of a main part of a head moving mechanism.
Figure 22:
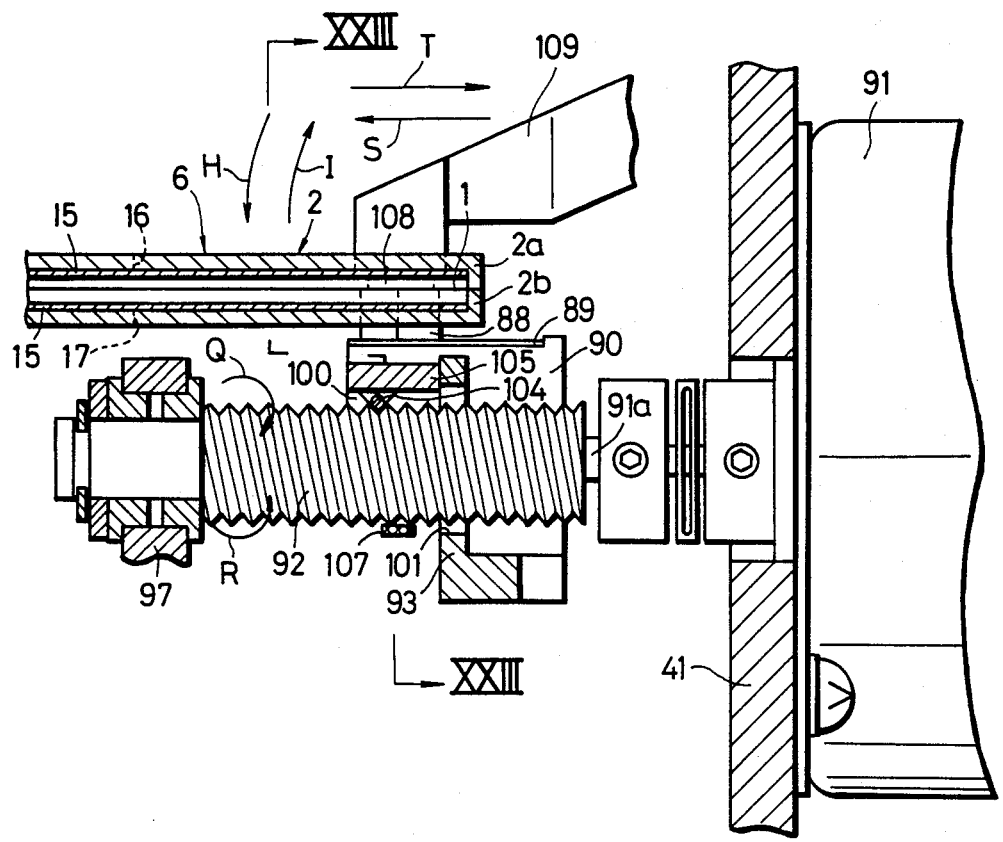
FIG. 22 is a sectional view taken on line XXII—XXII of FIG. 20.
Figure 23:
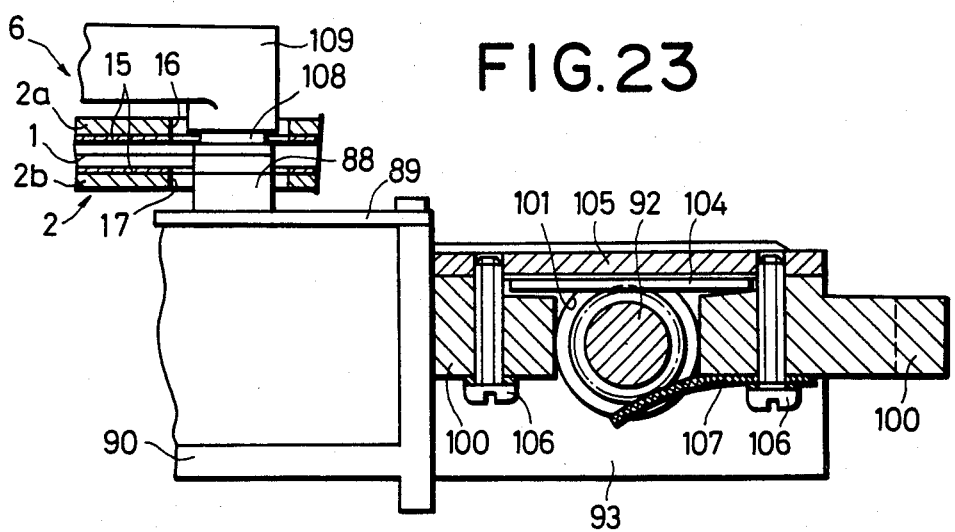
FIG. 23 is a sectional view taken on line XXIII—XXIII of FIG. 22.

With the head support 90, as shown in FIG. 10 and FIG. 20 there is integrally formed a pair of needle-like member mounting portions 100 which are opposed to each other in spaced relation. The feed screw 92 extends through an opening 101 formed in the vertical piece 93 of the head support 90, and is disposed between the pair of needle-like mounting portions 100. In the upper surfaces of the pair of mounting portions 100 there are formed V-shaped grooves 102a and 102b respectively, the V-shaped grooves 102a and 102b having an inclination corresponding to the pitch angle of the threaded portion of the feed screw 92 in the direction orthogonal to the axis of the feed screw 92 and extending on the same straight line. A needle-like member 104 is spanned between the pair of mounting portions 100 with its end portions inserted in the V-shaped grooves 102a and 102b Furthermore, as shown in FIG. 22, it is inserted without looseness between and along adjacent threads (i.e., the root) of the feed screw 92. Above the needle-like member 104 there is disposed a keep plate 105 which is fixed onto the upper surfaces of the mounting portions 100 with a pair of set screws 106 whereby the needle-like member 104 is secured to the mounting portions 100 in the aforesaid state of arrangement. Furthermore, as shown in FIG. 23, a leaf spring 107 is fixed to the lower surface of one mounting portion 100 with the setscrew 106, and by virtue of a resilient restoring force of the free end of the leaf spring 107, the feed screw 92 is normally urged to the needle-like member 104 and the threaded portion of the feed screw 92 never become disengaged from each other, and the needle-like member 104 is kept engaged without looseness between adjacent threads.

On the head support 90, as shown in FIG. 10 and FIG. 22, there is pivotably mounted a pad supporting member 109 which holds a pad 108 formed of felt or the like. More specifically, on the head support 90 there are mounted a pair of opposed vertical pieces 110 extending in the direction perpendicular to the chassis 41, and a bearing 111 is fixed to each of the vertical pieces 110 (see FIG. 10 and FIG. 11). Furthermore, pivots 112 fixed to the pad supporting member 109 are borne by the bearings 111, while between one vertical piece 110 and the head support 90 there is stretched a compression coiled spring 113. Accordingly, the head support 90 is normally urged around the pivots 112 in the direction of arrow H in FIG. 10 and FIG. 22, namely in the direction in which the pad 108 comes into pressure contact with the magnetic head 88. When the disk cassette 6 is not installed on the apparatus 40, the head support 90 is urged in the direction of arrow I in FIG. 10 against the urging force of the compression coiled spring 113 by means of a predetermined urging mechanism such as a plunger solenoid (not shown), so that the pad 108 is spaced from the magnetic head 88. That is, the state of the apparatus 40 shown in FIG. 10 is for the case when the disk cassette 6 is not installed or not in operation. When the disk cassette 6 has been installed or in operation, the head support 90 is pivotally moved in the direction of arrow H by virtue of the urging force of the compression coiled spring 113. As a result, as shown in FIG. 22, the magnetic disk 1 exposed to the openings 16 and 17 in the cassette cover 2 is held between the pad 108 and the magnetic head 88.

Figure 21:
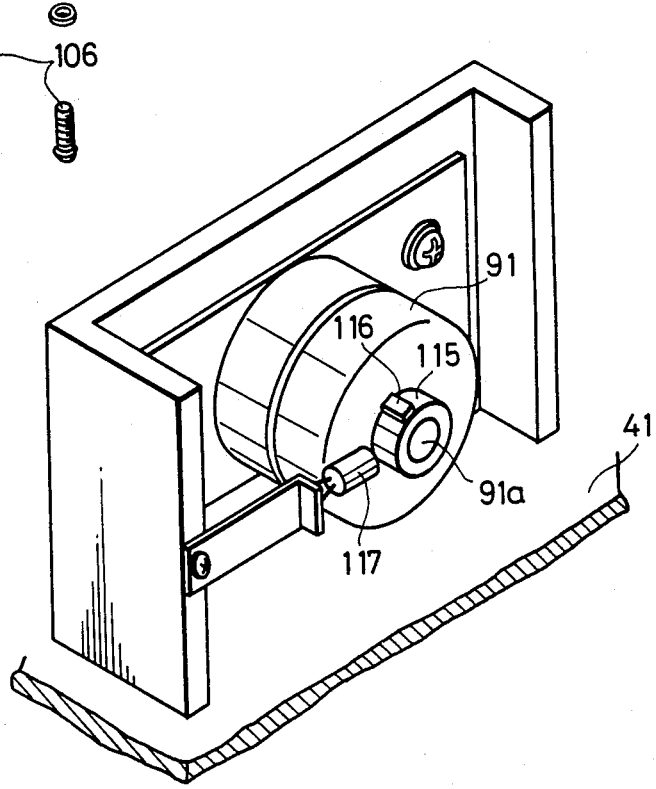
FIG. 21 is a perspective view of a rotational position detecting mechanism for the motor shaft of a step motor.

Referring now to FIG. 21, a disk 115 made of a synthetic resin or the like is coaxially fixed onto the other end of the motor shaft 91a of the step motor 91, and a reflector 116 is mounted on a part of the peripheral surface of the disk 115. On the other hand, a detector 117 consisting of a light emitting element and a light receiving element (photo-sensor) is disposed in opposed relation to the outer peripheral surface of the disk 115. A rotational position of the motor shaft 91a of the step motor 91 is detected by the function of the detector 117 and the reflector 116. A detection mechanism 117a for detecting a movement position of the head support 90 with respect to the feed screw 92, is mounted near both ends of the feed screw 92. On the basis of detection signals from this detection mechanism 117a and the detector 117, rotation start and stop positions of the motor shaft 91a are determined as will be described later. As a result, the magnetic head 88 can be moved by only an amount of movement required for the magnetic disk 1 to be recorded or reproduced by the magnetic head 88 (namely within a predetermined range of movement). The reference numeral 118 in FIG. 10 is an optical pulse generator for detecting a rotational phase of the flat-type brushless motor 63.

Figure 24:
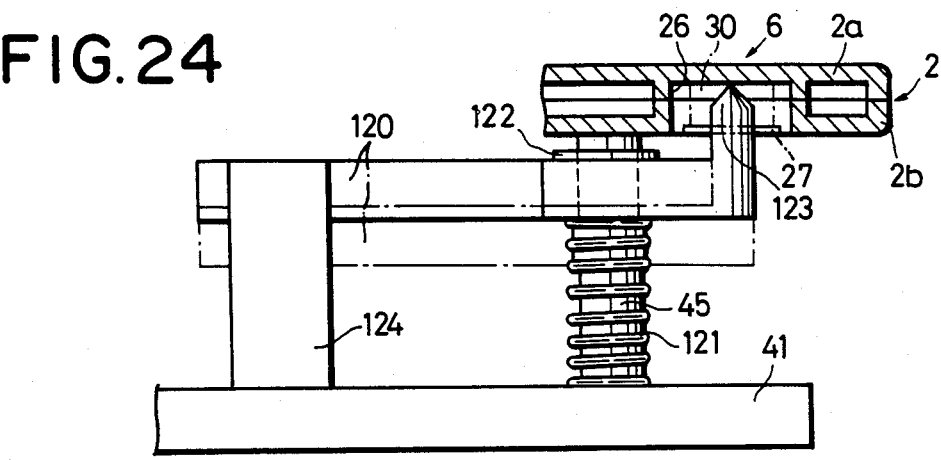
FIG. 24 is a longitudinal sectional view of a main part illustrating a correlative operation between the erroneous erase preventing detent of the disk cassette and an erroneous erase preventing detent detection member.
Figure 25:
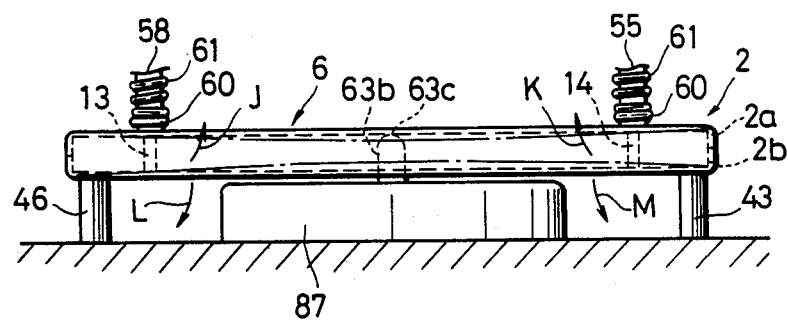
FIG. 25 is a schematic side view illustrating the principle of a correcting operation against an inward warp of upper and lower plates of the cassette cover.

On the cassette receiving pin 45, as shown in FIG. 10 and FIG. 24, there is mounted an erroneous erase preventing detent detecting member 120 movable along the axis of the pin 45. The detecting member 120 is provided at one end thereof with an upwardly projecting detector portion 123. The detecting member 120 is normally urged upwards by a compression coiled spring 121 and is retained by a stopper 122 mounted on the upper end portion of the pin 45. On the other hand, a detector 124 incorporating therein a light emitting element and a light receiving element (neither shown) disposed in opposed relation to each other, is attached to the chassis 41. The detector 124 is constructed so that the other end portion of the detecting member 120 can get in between the light emitting and receiving element along with a downward movement of the detecting member 120. That is, while the detecting member 120 is retained to the stopper 122 by the compression coiled spring 121, the other end portion of the detecting member 120 is spaced upwards from between the light emitting and receiving element. When the detector portion 123 of the detecting member 120 has been forced down by the erroneous erase preventing detent 27 of the cassette cover 2, the other end portion of the detecting member 120 gets in between the light emitting and receiving elements against the urging force of the compression coiled spring 121, whereby the recording operation is performed in the above case. Otherwise recording is prevented as will be described later.

In this embodiment, in order to prevent an erroneous installation (loading) of the disk cassette 6 onto the apparatus 40, there are formed erroneous installation preventing projections 126 and 127 on the chassis 41 side in opposed relation to the channel-shaped cutout portion 33 and the triangular cutout portion 32 both formed in the disk cassette 6, respectively.

Next, the following description is now provided about the operation of the apparatus 40 having the above construction.

First, the shutter 21 of the disk cassette 6 to be installed onto the apparatus 40 is slided in the direction of arrow A in FIG. 4 until the openings 16 and 17 of the disk cassette 6 and the opening 25 of the shutter 21 are overlapped with each other, whereby the openings 16 and 17 are opened and at the same time the channel-shaped cutout portion 33 of the disk cassette 6 is opened. Thereafter, the disk cassette 6 is installed onto the apparatus 40 by means of a cassette loading mechanism not shown. In this case, as shown in FIG. 12, the erroneous installation preventing projections 126 and 127 of the chassis 41 can get in the channel-shaped cutout portion 33 and the triangular cutout portion 32 of the disk cassette 6, respectively, so that the cassette cover 2 can be disposed in the normal loading position, and the disk cassette 6 is placed on the cassette receiving pins 43, 44, 45 and 46 by means of the cassette loading mechanism. In this case, the projections 47 and 48 of the cassette receiving pins 43 and 44 are respectively fitted into the positioning holes 31 and 32 formed in the cassette cover 2, whereby the positioning of the disk cassette 6 is effected in its planar direction, i.e., longitudinal and transverse direction. At the same time, the cassette pressure member 52 moves pivotally about the pivots 53 and 54 in interlock with the cassette loading mechanism, thus allowing the pins 55, 56, and 57 of the cassette pressure member 52 to force the disk cassette elastically downwards by virtue of the urging force of the compression coiled springs 61. Accordingly, the disk cassette 6 is held resiliently between the pins 43, 44, 45 and 46 and the pins 55, 56, 57, and 58 of the pressure member 52 whereby the positioning of the disk cassette 6 in the direction of the height is effected.

When installing the disk cassette 6, in case the cut-out portion 33 is covered with the shutter 21, or in case the triangular cut-out portion 32 is not disposed in the normal position (that is, in case the loading direction of the disk cassette 6 is not correct), since corner portions of the shutter 21 and the disk cassette 6 will strike against the projections 126 and 127, the disk cassette 6 is not disposed in the foregoing normal loading position. Consequently, the foregoing loading operation is not performed and hence recording and reproducing operations are not carried out. It is therefore not possible that the magnetic head 88 will be damaged upon its abutment with the shutter 21 which covers the opening 17 of the disk cassette 6.

On the other hand, the portion of the disk cassette 6 where the openings 16 and 17 are formed is inserted between the magnetic head 88 and the pad 108. For interlock during loading operation of the disc cassette 6 by means of the loading mechanism not shown, the pad supporting member 109 is pivotally moved in the direction of arrow H in FIG. 10 and FIG. 22 by virtue of the urging force of the compression coiled spring 113. It thus results in that a part of the flexible magnetic disk 1 exposed through the opening 25 in the shutter 21, the openings 16 and 17 in the cassette cover 2, and the opening 18 in the non-woven fabrics 15 is held between the magnetic head 88 and the pad 108.

In this case if the erroneous erase preventing detent 27 of the disk cassette 6 has not been folded off or removed, the detector portion 123 of the detecting member 120, as indicated with a dot-dash line in FIG. 24, is forced down against the urging force of the compression coiled spring 121 by the detent 27, thereby allowing the gap between the light emitting and receiving elements of the detector 124 to be interrupted. As a result, the apparatus 40 is ready to perform recording and reproducing operations on the basis of a predetermined signal from the detector 124. On the other hand, in case the detent 27 has been folded off, the tip end of the detector portion 123 of the detecting member 120 can get into the cutout portion of the cassette cover 2. Therefore, the detecting member 120 is left to be disposed in the upper position by virtue of the compression coiled spring 121, so that the gap between the light emitting and receiving elements of the detector 124 is not interrupted and hence the apparatus 40 is maintained in a state which will not perform a reproducing operation on the basis of a predetermined signal from the detector 124.

Along with such a loading operation of the disk cassette 6, the motor shaft 63b is inserted in the center aperture 4 of the center core disk 3 fitted in the driving hole 8 of the lower half 2b of the disk cassette 6. In this case, if the upper plate 2c of the loaded disk cassette 6 is warped (bent) toward the lower plate 2d as indicated with a dot-dash line in FIG. 25, the hemispherical top 63c of the motor shaft 63b comes into contact with the nearly central part of the inner surface of the upper plate 2c by the pins 55, 56, 57 and 58. As a result, when the loading of the disk cassette 6 is over, the deformation (inward warp) of the upper plate 2a is already corrected and the upper plate 2a is flat as indicated with a solid line in FIG. 25.

On the other hand, when the disk cassette 6 has been installed, the pressing position of the pins 55, 56, 57, and 58 of the pressure member 52 are on the diagonal lines of the pins 43, 44, 45 and 46 as previously noted; these positions correspond to the ribs 13 and 14 of the disk cassette 6. Therefore, if the lower plate 2d of the disk cassette 6 to be installed is deformed inwardly, namely toward the upper plate 2c as indicated with a dot-dash line in FIG. 25, the lower plate 2d undergoes a force in the direction of arrows L and M through the ribs 13 of the upper half 2a and the ribs 14 of the lower half 2b. It thus results that the deformation of the lower plate 2d becomes flat as indicated with a solid line in FIG. 25.

In this embodiment, as set forth above even if the upper and lower plates 2c and 2d both are warped (deformed) inwardly, this warp (deformation) can be corrected to a satisfactory extent. As a result, the space within the cassette cover 2 when installed can always be maintained constant, there is no fear of an obstacle to the rotation of the magnetic disk 1, and the flexible magnetic disk 1 can be rotated with a relatively small driving torque.

Along with the aforesaid installation (loading) of the disk cassette 6, the center core disk 3 is attracted by the magnets 84 of the yoke 70 and is disposed on the lubricant sheets 85 and 86 respectively stuck on the upper surfaces of the flanges 70a and 70b of the yoke 70. In this case, if the position of the driving and positioning aperture 5 in the center core disk 3 and that of the spring-biased pin 65 are shifted from each other, the pin 65 is forced down by the center core disk 3 by virtue of the attractive force exerted between the center core disk 3 and the magnets 84. As a result, as shown with a solid line in FIG. 18, the pin 65 is forced down against the resilient restoring force of the leaf spring 66, particularly the arm portion 75. In such a state, when the apparatus is changed to the recording or reproducing mode and the motor shaft 63b of the motor 63 is rotated, the pin 65 rotates together with the leaf spring 66 and the yoke 70 with respect to the center core disk 3. At this time the flexible magnetic disk 1 is held between the magnetic head 88 and the pad 108 as previously noted, whereby load torque is exerted on the magnetic disk 1. Consequently, even if a frictional force is exerted between the lubricant sheets 85 and 86 stuck on the yoke 70 and the center core disk 3, and between the latter and the pin 65, the center core disk 3 is not rotated and the pin 65 moves around relatively to the stationary center core disk 3. Thereafter, when the driving and positioning aperture 5 in the center core disk 3 is reached, as indicated with a dot-dash line in FIG. 26, the cylindrical portion 81 of the pin 65 gets in the aperture 5 by virtue of the resilient restoring force of the leaf spring 66. Then, as the motor shaft 63b rotates in the direction of arrow N, the pin 65 is further moved around and the cylindrical portion 81 of the pin 65 comes into engagement first with a positioning edge 5a located farther from the motor shaft 5b out of a pair of longer edges of the aperture 5. Then the pin 65 is further moved around and comes into engagement with a driving edge 5b of the aperture 5 while the cylindrical portion 81 of the pin 65 is rotated with the ball bearing 80 since a holding force induced by the magnetic head 88 and the pad 108 and an inertia force caused by the difference in revolution between the yoke 70 and the center core disk 3, are exerted as a load torque on the magnetic disk 1 and the center core disk 3. In this case, as previously noted, since the distance S1 shown in FIG. 17 is set slightly longer than the distance S2 shown in FIG. 26, the pin is brought into an inclined state by a torsional deformation of the arm portion 75 of the leaf spring 66 as illustrated in FIG. 19. As a result, the axis of the pin 65 now has a slight inclination with respect to the vertical direction in FIG. 19, so that on the center core disk 3 there normally is exerted an urging force in the direction of arrow P in FIG. 19 and FIG. 26 through the cylindrical portion 81 of the pin 65 by virtue of the resilient restoring force of the arm portion of the leaf spring 66.

Figure 26:
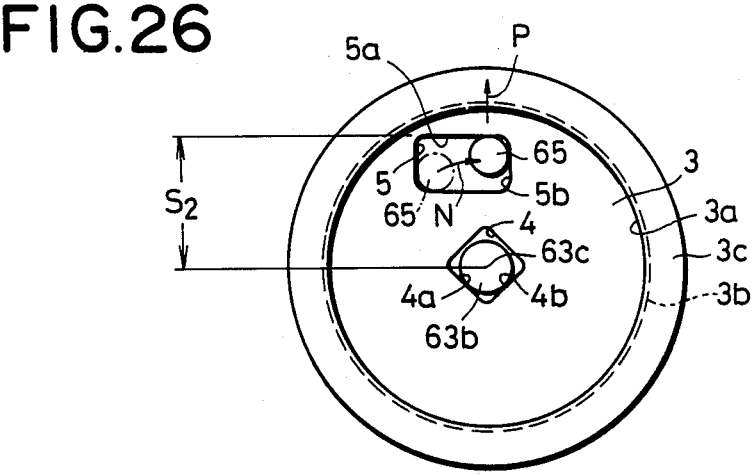
FIG. 26 is a plan view of the center core disk in a positioned state with the motor shaft and the spring-biased driving pin respectively inserted in the motor shaft insertion opening and the spring-biased driving pin insertion opening both formed in the center core disk.

Although the load torque applied to the flexible magnetic disk 1 by the magnetic head 88 and the pad 108 is small, the provision in this embodiment of the ball bearing 80 between the stem portion 78 and the cylindrical portion 81 allows the pin 65 to be sure to move to the predetermined position indicated with a solid line in FIG. 26, even if the forming accuracy of the insertion apertures 4 and 5 in the center core disk 3 is not very high.

As the center core disk 3 is moved in the direction of arrow P, two sides 4a and 4b of a V-shaped corner located farther from the driving and positioning aperture 5 out of four sides of the motor shaft insertion aperture 4 are brought into pressure contact at two points with the motor shaft 63b, and the center core disk 3 is positioned. Accordingly, the center of the flexible magnetic disk 1 stuck on the center core disk 3 is positioned nearly on the axis of the motor shaft 63b. In this state, as the motor shaft 63b rotates and the pin 65 is moved around in the direction of arrow N in FIG. 26, the cylindrical portion 81 of the pin 65 pushes the driving edge 5b of the aperture 5 so that the center core disk 3 and hence the magnetic disk 1 is rotated in the direction of arrow N. In this case, since the flexible magnetic disk 1 is disposed concentrically with the motor shaft 63b as previously noted, it is rotated in an almost centered state.

Next, an explanation is here given about the operation of the head moving mechanism. First, when the apparatus 40 is changed, for example to the reproducing mode in a loaded state of the disk cassette 6 in the manner as set forth hereinbefore, the flexible magnetic disk 1 rotates in the previously described manner. Along with this rotation, a recorded information is read-out by the magnetic head 88 which is in sliding contact with the recording surface of the flexible magnetic disk 1, and a synchronizing signal contained in the read-out information is supplied to a step motor driving circuit (not shown). Every time such a synchronizing signal is supplied, a predetermined driving current is provided from the above driving circuit to the step motor 91, whereby the motor shaft 91a is rotated in the direction of arrow Q (shown in FIG. 10 and FIG. 22) in steps by a predetermined rotational angle (e.g. 15°). Along with this rotation of the motor shaft 91a, the needle-like member 104 inserted without looseness between adjacent threads of the feed screw 92 is moved in the direction of arrow S by the feed screw 92. Thereby the head support 90, together with the needle-like member 104, is guided by the guide shaft 96 and moves stepwise to the next circular recording track intermittently, namely at every rotation of flexible magnetic disk 1 in the direction of arrow S. Consequently, the magnetic head 88 and the pad supporting member 109 both mounted on the head support 90 slide integrally with each other and with the flexible magnetic disk 1 held therebetween, and move intermittently in the longitudinal direction within the head and pad insertion openings 16 and 17 in the disk cassette, namely along a radial direction of the flexible magnetic disk 1.

In this embodiment, as the pitch of the feed screw 91 is relatively small and the motor 91 has a relatively large rotational angle (e.g. about 15°) per one step, even if the recording track pitch on the flexible magnetic disk 1 is small, it is possible to effect positioning of the magnetic head 88 with high accuracy with respect to the recording track to be reproduced. This is because even if step motors have the same mechanical accuracy in a single step rotation, the ratio of this mechanical accuracy to the one step rotational angle is smaller in a step motor having a wider rotational angle, and therefore the magnetic head 88 can be moved with high accuracy.

During the above movement, the feed screw 92 undergoes a downward force in FIG. 22 and FIG. 23 through the needle-like member 104. But since an urging force toward the needle-like member 104 is exerted at all times on the feed screw 92 by means of the leaf spring 107, the threads of the feed screw 92 and the needle-like member 104 will never become disengaged.

In this way, the magnetic head 88 in sliding contact with the flexible magnetic disk 1 moves stepwise and radially from the outer peripheral side toward the center of the magnetic disk 1 at every rotation of the motor shaft 63b, namely every time there is fed a synchronizing signal recorded on each circular recording track. When the head support 90 has been moved to a predetermined position and the magnetic head 88 has reached near the inside terminal edge portion of the magnetic surface of the flexible magnetic disk 1, the position of the head support 90 is detected by a detection mechanism 117a. Then, when the detector 117 and the reflector 116 have become opposed to each other along with the rotation of the motor shaft 91a of the step motor 91, the rotation of the motor shaft 91a in the direction of arrow N is stopped on the basis of detection signals from the above detection mechanism 117a and the detector 117. Conversely, in case the feed screw 92 has been rotated in the direction of arrow R in FIG. 10 and FIG. 22 by means of the step motor 91, the magnetic head 88 is moved from the radially central side of the flexible magnetic disk 1 toward the outer peripheral side (in the direction of arrow T in FIG. 10 and FIG. 22). And when it has reached the outside terminal edge portion of the magnetic surface, the rotation of the motor shaft 91a in the direction opposite to the previous arrow N direction is stopped.

Along with the above operation the information recorded on the recording surface of the flexible magnetic disk 1 is reproduced. Also in the recording operation, the same operation is performed as set forth hereinbefore.

According to the disk cassete 6 having the above construction, the pad and head insertion openings 16 and 17 can be opened or closed selectively by moving the shutter 21. Therefore, by keeping the openings 16 and 17 closed while the disk cassette is not in use, it is possible to prevent dust from entering the cassette cover 2 through the openings 16 and 17. As a result, the adhesion of dust to the recording medium and the insertion of a hand or other foreign matter into the cassette cover 2 can be prevented, and this allows the disk cassette 6 to be arranged and stored without the necessity of using a cassette protecting jacket as in the prior art.

The cassette cover 2 is very thin and made of a synthetic resin so its strength is very low and is easily deformed. But if a relatively strong shutter 21 formed of a hard material is mounted on the cassette cover 2, the shutter 21 acts as a reinforcing member for the cassette cover 2. As a result, not only the strength of the cassette cover 2 is increased enough to prevent its deformation, but also it comes possible to write a predetermined information on the label stuck on the cassette cover 2, directly with a pencil or a ball-point pen. Besides, since the shutter 21 has been constructed relatively long, the slide of the shutter 21 can be done smoothly by the guide means consisting of the guide groove 22 formed in the cassette cover 2 and the projection 23 of the shuter 21. This is easily performed even in a small-sized construction of the disk cassette 6.

Furthermore, the channel-shaped cutout portion 33 is formed in the portion of the cassette cover 2 where there is mounted the shutter 21 so that the cutout portion 33 can be opened or closed according to opening or closing of the openings 16 and 17 by the shutter 21. Therefore, by utilization of the cutout portion 33 it is possible to prevent an erroneous installation of the disk cassette 6 and hence damage of the magnetic head 88, and moreover the cutout portion 33 is also utilizable for detection of the kind and loading direction of the cassette.

Furthermore, since the shutter mounting and demounting recess 36 is formed in a predetermined position of the cassette cover 2 in association with the projection 23 of the shutter 21, the shutter 21 can be easily mounted on and demounted from the cassette cover 2.

Although the illustrative embodiments of the invention have been described in detail herein with reference to the accompanying drawings, it is to be understood that the invention is not limited to the precise embodiments, and that various changes and modification can be effected therein by one skilled in the art without departing from the scope and spirit of the invention as defined in the appended claims.

We claim as our invention:

1. A flexible magnetic disk cassette, comprising:
   (a) a flexible magnetic disk;
   (b) a cover containing said magnetic disk, said cover having a drive hole means for providing access to drive said flexible magnetic disk from outside said cover, a recording opening means for exposing a recording surface of said flexible magnetic disk, and a cut-out portion means provided on one side of said cover for detecting correction installation of said flexible magnetic disk cassette into a recording and/or reproducing apparatus;
   (c) a shutter means slidably provided on said cover for selectively exposing said recording surface through said recording opening means and exposing said cut-out portion means when said flexible magnetic disk is ready for use; and
   (d) said shutter means preventing a correct installation of said magnetic disk cassette when the shutter means covers said cut-out portion means.

2. A flexible magnetic disk cassette as claimed in claim 1, wherein said shutter means has a U-shaped form with opposed plate portions and is provided to be engaged at one side edge of said cover.

3. A flexible magnetic disk cassette as claimed in claim 2, wherein said shutter means has an opening similar to said recording opening means provided on said cover, and when said flexible magnetic disk cassette is ready for use said opening of the shutter is positioned just on said recording opening means provided on said cover.

4. A flexible magnetic disk cassette as claimed in claim 3, wherein said cover has recess means on a surface of said cover to hold and guide said shutter means slidably mounted on said cover between operative and inoperative positions.

5. A flexible magnetic disk cassette comprising:
   (a) a flexible magnetic disk having a recording surface;
   (b) a cassette cover containing said magnetic disk, said cover having a driving hole means for providing access to drive said flexible magnetic disk with a driving apparatus external to said cover, a recording opening means permitting access to a recording surface of said flexible magnetic disk, and a cut-out portion means provided on said cover for detecting correct installation of said flexible magnetic disk cassette into a recording and/or reproducing apparatus;
   (c) a shutter means slidably provided on said cassette cover for selectively permitting access to said recording surface through said recording opening means and exposing said cut-out portion means when said flexible magnetic disk is ready for use; and
   (d) said shutter means for proventing a correct installation of said magnetic disk cassette when the shutter means is slid in a position to completely cover said cut-out portion means.

6. A flexible magnetic disk cassette, comprising:
   a rectangular case enclosing a flexible magnetic disk adapted to be rotated therein, said rectangular case having head insertion openings on both sides in facing relation adjacent magnetic surfaces of the enclosed disc;
   a U-shaped shutter having head access openings in facing relation and slidably mounted on one edge of said rectangular case so as to provide respective head access holes to the magnetic disk in the same position on respective opposite sides of the cover when said U-shaped shutter is in an operative position for recording; and
   a cut-out portion means on the case and positioned for selective exposure by the shutter for determining when said flexible magnetic disc is installed correctly, and which together with placement of the shutter on the case, prevents correct installation of the cassette when said shutter is in an inoperative position and the cut-out portion means is not exposed.

7. A flexible magnetic disk cassette according to claim 6 wherein said case has a guide groove means at said edge for guiding and retaining the shutter on the rectangular case, and at least one projection means provided on said shutter is inserted in said guide groove means for guiding and for protecting against accidental separation of said shutter from said case.

8. A flexible magnetic disk cassette according to claim 6 wherein said rectangular case has a shutter mounting and demounting guide means for enabling simplified installment of said shutter onto said rectangular case and removal thereof.

9. A flexible magnetic disk cassette, comprising:
   a rectangular case enclosing a flexible magnetic disk adapted to be rotated therein, said rectangular case having a head insertion opening on at least one side thereof adjacent a magnetic surface of the enclosed disk;
   a removable U-shaped shutter with opposed plate portions and central connecting portion in one of the plate portions and slidably mounted on one edge of said rectangular case so as to provide a respective head access hole to the magnetic disk when the head access opening of the shutter is in alignment with the head insertion opening of the case;

groove means attaching said shutter to said case for guiding the shutter for sliding operation of the central connecting portion along an edge of said case; and means associated with said groove means for permitting simple mounting and demounting of said shutter when said shutter is in a predetermined sliding position.

10. A flexible magnetic disk cassette, comprising:

a flexible magnetic disk having a central core with a driving aperture therein;

a cover containing the magnetic disk, said cover having a driving hole means for providing access to drive the flexible magnetic disk from outside said cover, a recording opening means for exposing a recording surface of the flexible magnetic disk, both the recording opening means and the driving hole means being provided in a lower wall of the cover;

a U-shaped shutter means formed of opposed plate portions and a central connecting portion removably and slidably mounted along an edge of said cover for selectively exposing said recording surface through said recording opening means when said flexible magnetic disk is ready for use;

groove means attaching said shutter to said case for guiding the shutter means for sliding operation of the central connecting portion along said edge of the case;

means associated with said groove means for permitting simple mounting and demounting of said shutter means when said shutter means is in a predetermined sliding position; and recess means in said cover for receiving and limiting slidable movement of the opposed plate portions of the shutter means.

* * * * *